United States Patent
Fuoss et al.

(10) Patent No.: US 7,003,308 B1
(45) Date of Patent: Feb. 21, 2006

(54) METHOD AND SYSTEM FOR HANDWRITTEN ELECTRONIC MESSAGING

(75) Inventors: Paul Henry Fuoss, Convent Station, NJ (US); Howard Paul Katseff, Marlboro, NJ (US); Robert Edward Markowitz, Glen Rock, NJ (US); Bethany Scott Robinson, Lebanon, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/009,193

(22) Filed: Dec. 10, 2004

Related U.S. Application Data (63) Continuation of application No. 09/659,653, filed on Sep. 12, 2000, now abandoned.

(51) Int. Cl.
*H04Q 7/20* (2006.01)
*H04B 1/38* (2006.01)
*G06F 15/00* (2006.01)
*G09G 5/00* (2006.01)

(52) U.S. Cl. .................. 455/466; 455/566; 455/556.2; 715/541; 345/173; 345/179

(58) Field of Classification Search ................ 455/466, 455/556.2, 556, 550.1, 412.1; 715/541, 531; 345/156, 173, 179
See application file for complete search history.

(56) References Cited

U.S. PATENT DOCUMENTS 6,304,898 B1 * 10/2001 Shiigi ........................ 709/206

* cited by examiner

*Primary Examiner*—Nick Corsaro
*Assistant Examiner*—Eugene Yun (57) ABSTRACT

The present invention provides a system and method for providing handwritten messages with electronic communication devices. For example the electronic communication device may be a mobile communication device and may include a touch screen, screen buffer memory, processor, and transceiver. In preferred embodiments, the mobile communication device may be a personal digital assistant (PDA), a two-way pager, or a mobile telephone. The mobile communication device user may create a handwritten message on the touch screen using, for example, a stylus. In one exemplary embodiment, the handwritten message displayed on the touch screen may be stored to the buffer memory as an image, directed by the processor to the transceiver, and transmitted via a wireless connection to, for example, a wireless base station and the Internet. The Internet may route the handwritten message image to a desired Internet address. The handwritten message may be displayed in real time on the recipient's display, e.g., an instant message (IM) session, or stored in their email mailbox for later retrieval and display. The recipient may type in a text message in response to the hand written message, and this message will be transmitted to mobile communication device and displayed on the mobile communication device. In another embodiment, the receiving party may also have handwritten messaging capabilities (included with, for example, a PC, PDA or a mobile phone) and may respond with a handwritten message.

2 Claims, 7 Drawing Sheets

METHOD AND SYSTEM FOR HANDWRITTEN ELECTRONIC MESSAGING

CROSS-REFERENCE TO RELATED APPLICATION

This is a continuation of U.S. patent application Ser. No. 09/659,653 filed Sep. 12, 2000 now abandoned.

TECHNICAL FIELD

The present invention relates to electronic communications, and more particularly, to providing handwritten messaging in electronic communications.

BACKGROUND OF THE INVENTION

Presently, a number of electronic communication devices provide text messaging for a user. A number of mobile communication devices provide 2- way text messaging, i.e., the user of the mobile communication device can send and receive text messages. Text messages are typewritten using letters and numbers input via, for example, a keyboard or keypad. The mobile communication device user may type the text message in real time or may select a message from predetermined canned typewritten messages. For example, the Motorola Pagewriter™ 2000 is a two way text pager that allows a user to receive a text message email message and return a typewritten text message by typing on a tiny keyboard. As another example, the Motorola V700 word message pager is a two way text pager which allows the user to receive an email message and respond by selecting a predetermined text message previously stored in memory. At times, such text messages are difficult to compose or select in real time because of the user's location or environment. It is often considered distracting and socially rude to type on a keyboard or fumble with selection buttons on a pager while, for example, attending a meeting, listening to a lecture, or appearing in a court room. Further, there are times when typing on a small keypad may be impractical; for example, when a user is riding in a car. Therefore, there is need for a less intrusive and more versatile method of sending messages from electronic communication devices, particularly mobile electronic communication devices.

SUMMARY OF THE INVENTION

The present invention provides a system and method for providing handwritten messages with electronic communication devices. According to the invention, an electronic communication device may include a touch screen, screen buffer memory, processor, and transceiver. In preferred embodiments, the electronic communication device may be a mobile communication device, for example, a personal digital assistant (PDA), a two-way pager, a mobile telephone, or a simplified wireless touch screen. The mobile communication device user may create a handwritten message on the touch screen using, for example, a stylus. In one exemplary embodiment, the handwritten message displayed on the touch screen may be stored to the buffer memory as a digital image (e.g., a graphic image), directed by the processor to the transceiver, and transmitted via a wireless connection to, for example, a wireless base station coupled to the Internet, a PSTN, or a broadband communication system. The handwritten message may also be stored in a system memory that can accommodate a message which is of greater length then the touch screen size. The Internet may then route the handwritten message image to a desired internet address. The handwritten message may be displayed in real time on the recipients display, e.g., an instant message (IM) session, or stored in their email mailbox for later retrieval and display. In one embodiment, the recipient may type in a text message in response to the handwritten message, and this message will be transmitted to the mobile communication device and displayed on the mobile communication device. In another embodiment, the receiving party may also have a communication device (mobile or stationary) including handwritten messaging capabilities and may respond with a handwritten message. In a further embodiment, the handwritten electronic communication message may be automatically re-sized to, for example, the screen size of the receiving communication device.

DESCRIPTION OF THE PREFERRED EMBODIMENTS

Today electronic communications are wide spread and include voice and text communication (e.g., email messaging). Text communications are achieved using a keyboard, keypad, or even a graphic conversion to a typed text (e.g., Graffiti on a Palm™ Handheld Computer). However, these methods are cumbersome on small devices and even on larger devices for those users who are not skilled at typing. Recent development of electronics and touch screen displays with high density digital pixels make legible handwritten messages possible. Thus, electronic communication may now be performed, according to the present invention, using handwritten message images drawn or scribed on a touch screen display. Messages created by writing on a touch screen may be more easily and quickly created than a typewritten message for most people. Further, handwritten message capability is even more useful when incorporated in mobile communication devices.

Many busy people carry two way mobile communication devices such as mobile telephones, two-way pagers, personal digital assistants, laptop computers, etc., so that they can communicate with others anywhere, anytime. However, presently available manners of communicating with these mobile communication devices (e.g., typing, talking, etc.) are often intrusive and fail to provide a manner of unobtrusively communicating at particular times, for example, during a meeting. The present invention provides a system and method for providing unobtrusive and versatile two-way communications using handwriting.

In the present invention electronic communication devices are equipped for communications using handwritten messages. In one embodiment, a mobile communication device may include a touch screen, processor (e.g., a microprocessor), and transceiver. This configuration may be augmented with a screen memory and/or system memory. In preferred embodiments, the mobile communication device may be, for example, a personal digital assistant (PDA), a two-way pager, a mobile telephone, or simply a wireless touch screen. Of course, the communication device need not be mobile but may be of a stationary kind, for example a desktop personal computer, including a touch screen or touch pad. The system is provided with software or firmware which enables the electronic communication device to capture, package and transmit handwritten communications as, for example, an electronic mail message.

In operation, the user of the communication device may create a handwritten message on a touch screen using, for example, a stylus, finger or other handwriting instrument. Alternatively, the handwritten image could be created using a mouse, pointing stick, pen and tablet, or other graphical input device. The handwritten image is retained in a memory of the handwritten communication device, for example, a screen memory associated with the touch screen device. The message may also contain typed text, an HTML-encoded document, images, voice, and/or video information. In any case, once created, the system will then transmit the handwritten message as an image in, for example, an instant message (IM) format, email message format such as Simple Mail Transfer Protocol (SMTP), or a facsimile format. The SMTP formatted message may use a format for including non-text information, for example, Multipurpose Internet Mail Extensions (MIME). Once properly formatted, the message is transmitted to another communication device via, for example, a wireless communication network and the Internet, where it is displayed as an image.

In one exemplary embodiment, the handwritten message displayed on the touch screen may be stored to a buffer memory as a digital image (e.g., a graphic image), directed by a processor to a transceiver, and transmitted via a communication connection (e.g., a wire or wireless connection) to, for example, the Internet, a PSTN, or a subscriber broadband communication system. The communication system, e.g., the Internet, may then route the handwritten message image to a desired location, e.g., Internet address.

The handwritten message my be displayed in real time on the recipient's display, e.g., an instant message (IM) session, or stored in their email mailbox for later retrieval and display.

The recipient of a handwritten image communication may respond with a typed text message or a handwritten message. In one embodiment, the recipient may type in a text message in response to the handwritten message and this message will be transmitted to the mobile communication device and displayed on the mobile communication device. In another embodiment, the receiving party may also have a communication device (mobile or stationary) including handwritten messaging capabilities, and may respond with a handwritten message.

Further, the handwritten communication device according to the invention may scroll the display of the touch screen to accommodate a greater length or width handwritten message. This greater length handwritten message may be stored, at least in part, in, for example, a system memory large enough to accommodate a message which is of greater size then a single screen size. In fact, the screen could include 3D message capabilities.

A more detailed description of preferred embodiments of the electronic handwritten communications systems and methods for the present invention follows. These embodiments are understood to be merely exemplary and the invention is not intended to be limited thereto.

Figure 1A:
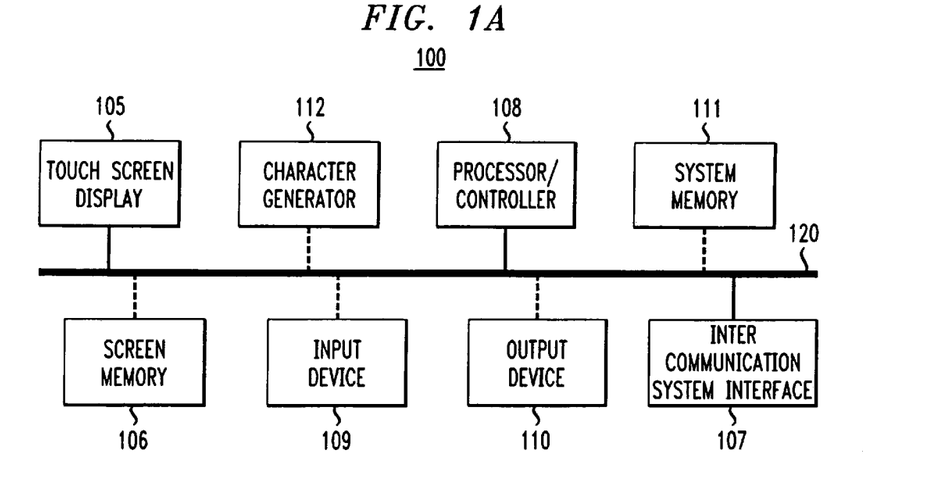
FIG. 1A shows a first block diagram for the configuration of various electrical components which may be included in a mobile handwritten message device in accordance with one embodiment of the present invention.

A first exemplary handwritten communication device 100 that can provide electronic handwritten communications is illustrated in FIG. 1A. The device 100 includes a mechanism for displaying incoming communications and outgoing handwritten communications, for example, a touch screen display 105. The touch screen display 105 is coupled to a databus 120 which is used to integrate communications between each component of the device 100. The touch screen display 105 may display, for example, an incoming message and/or an outgoing message including a handwritten electronic mail message. The system further includes a processor/controller 108 and an inter communication system interface 107 connected to the databus 120. The processor/controller 108 may be a microprocessor including memory such as RAM, flash memory, and/or ROM needed to support the operations of the device. The inter communication system interface 107 may be a wireless communication port or a hard wire communication port, including a transceiver, to send and receive communications from, for example, the Internet, a PSTN, or a broadband communication system.

As illustrated using dashed lines, the handwritten communication device 100 may also include a screen memory 106, an input device 109, an output device 110, a system memory 111, and a character generator 112 coupled to the databus 120. Screen memory 106 may be, for example, RAM or flash memory and store data indicative of activated or deactivated pixels on the touch screen display 105 which have been contacted by a user creating a handwritten communication (or input via a keyboard to create a typed text communication message). Alternatively, this information could be stored in the memory of the processor/controller 108. The input device 109 may be, for example, a keyboard or keypad which may be physically separate, integral to the device, or a simulated keypad displayed on a portion of the touch screen display 105. The input device may also integrate the touch screen handwriting capabilities previously described as being related to the touch screen display 105. The output device 110 may be, for example, a speaker, a buzzer, a light, a vibrator, or any other mechanism for alerting a user of an incoming message. The handwritten communication device 100 may alert a user of an incoming message by flashing all or a portion (e.g., an icon) of the display on the touch screen display 105. The system memory 111 may include, for example, a RAM and/or flash memory and may be used to store a handwritten communication received or to be transmitted by the inter communication system interface. It may be particularly useful in storing large or long messages. The character generator 112 may be a character generator well known in the art which will decode a digitally encoded message and generate characters from received communications for display on the touch screen display (e.g., a text email message).

Figure 1B:
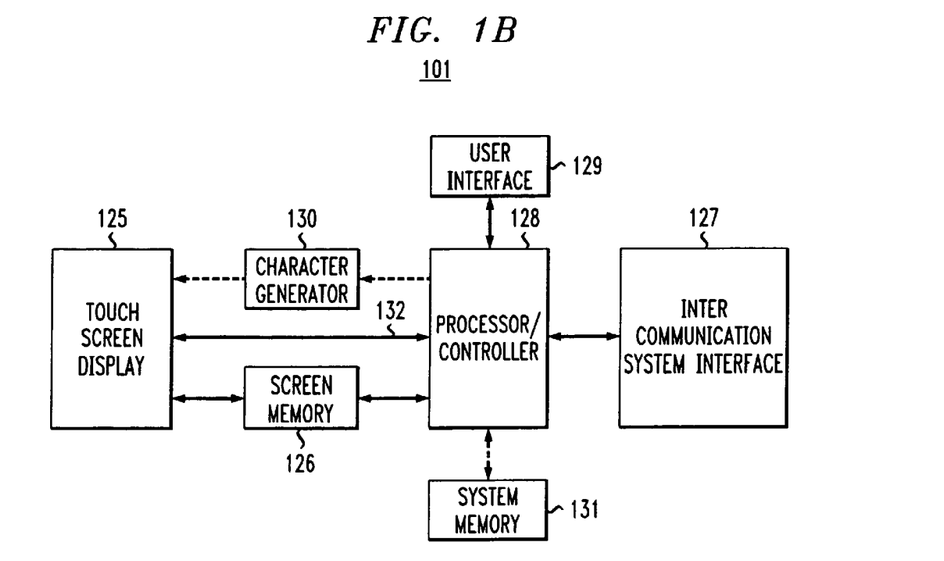
FIG. 1B shows a second block diagram for the configuration of various electrical components which may be included in a mobile handwritten message device in accordance with another embodiment of the present invention.

An alternative system architecture for a handwritten communication device 101 according to the present invention is illustrated in FIG. 1B. In this preferred embodiment, the components of the device are coupled to one another rather than a central databus. Referring to FIG. 1B, the device 101 includes a touch screen display 125 coupled to a processor/controller 128 and the processor/controller 128 may be coupled to an inter communication system interface. The touch screen display 125 may display incoming communications and outgoing communications, including handwritten communications. The touch screen display 125 is coupled to the processor/controller 128 via signaling line 132. The signalling line 132 may carry signals indicating pen touch events on the touch screen display 125 or may carry signals of an incoming communication image. The processor/controller 128 may be, for example, a microprocessor including memory such as RAM, flash memory, and/or ROM needed to support the operations of the device. The inter communication system interface 127 may be a wireless communication port or a hard wire communication port, including a transceiver, which may send and receive communications to and from, for example, the Internet, a PSTN, or a broadband communication system. In a preferred embodiment the transceiver would have digital capabilities. A screen memory 126 is coupled to the touch screen display 125 and the processor/controller 128 and may provide a store for images, including handwritten communications input by contacting the touch screen display with, for example, a stylus. As would be understood by one skilled in the art, the screen memory 126 may be integral to the touch screen display 125. The handwritten communication device 101 may further include a user interface 129 coupled to the processor/controller 128. The user interface 129 may be a stylus contacting the touch screen display 125 and a sensor for sensing the contact of the stylus. The user interface 129 may further include a keyboard or keypad entry device and/or an output device such as a speaker. This output device could also be a light, vibrator, etc. Finally, the handwritten communication device 101 may include a system memory 131 coupled to the processor/controller 128 and a character generator 130 coupled to the processor/controller 128 and the touch screen display 125.

The handwritten communication device would further include software and/or firmware that enables a user to create a handwritten message by writing on the touch screen display and transmit that message to another communication device and/or system via the inter communication system interface. This process would be supervised by the processor/controller. An exemplary method illustrating the operating of the present invention including appropriate software and/or firmware is provided in FIG. 2.

Figure 2:
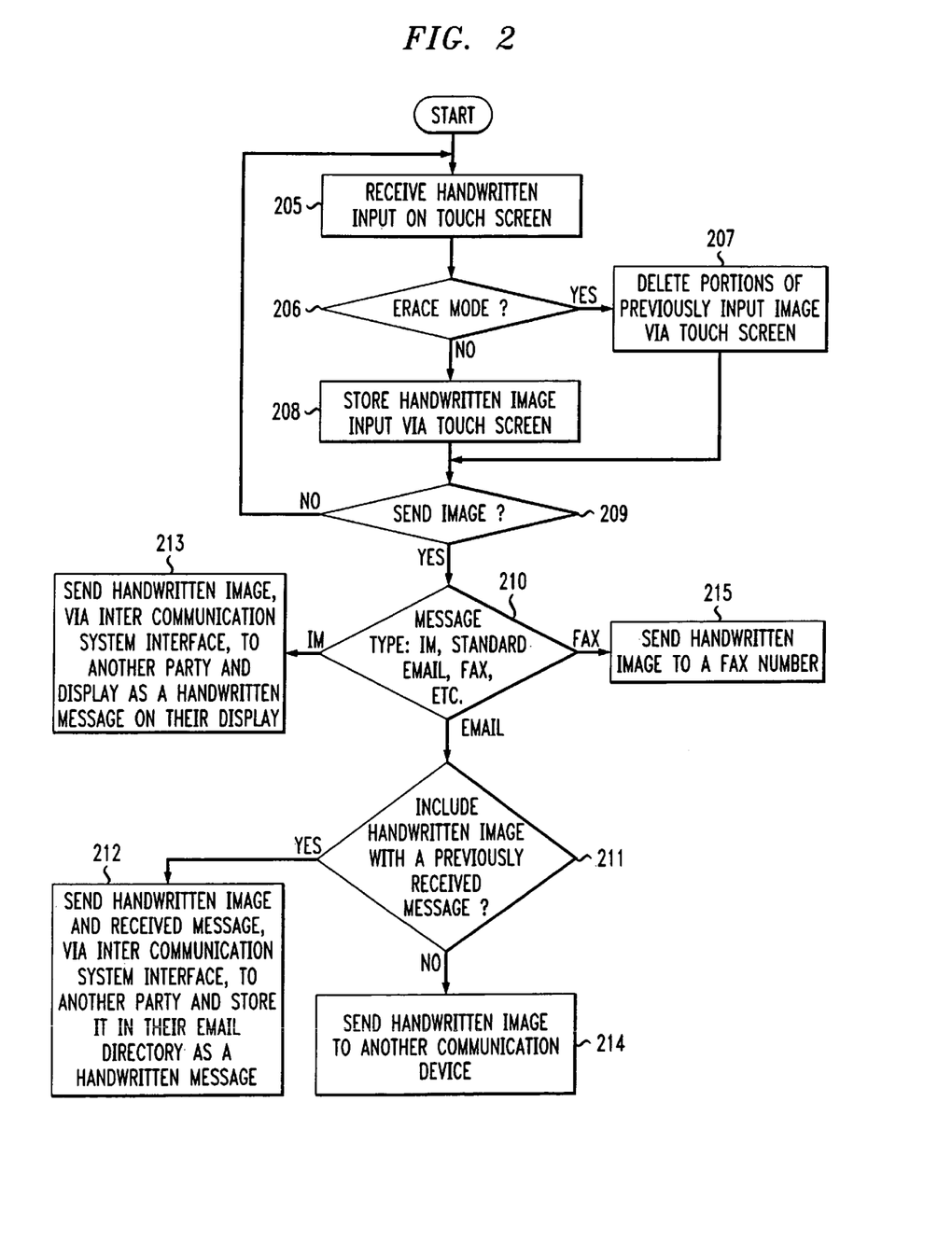
FIG. 2 is a process flow diagram illustrating one exemplary method of providing handwritten messaging in accordance with the present invention.

The handwritten communication device may have multiple communication modes including typed text communications, handwritten communications, voice communications, etc. If so, the handwritten communication device will contain a means for mode selection such as a button or code entered via the touch screen or a keypad. Referring to FIG. 2, once in the handwriting communication mode, first the handwritten communication device receives handwritten input on the touch screen 205 by a user touching the screen with a pointing device, for example, a stylus, pen, finger, etc. Then, at decision step 206, the handwritten communication device determines if it is set to the erase mode. If so, then at step 207 portions of a previously input image are deleted according to the pixels of the touch screen being touched by the pointing device. If not, then at step 208 the handwritten communication device concludes that the user intends to create a handwritten communication and stores the identity of pixels of a handwritten image input via touching the touch screen display. In either case, the handwritten communication device then determines at decision step 209 if the image as created should be transmitted via the inter communication system interface. This may be achieved by activation of, for example, a send button or icon. If the image is not to be presently sent, the device will continue to allow the image to be modified by further erasing or handwriting/drawing. If the image is to be presently sent, then at decision step 210, the handwritten communication device determines if the communication is part of a real time interactive communication session (e.g., an instant message (IM)), part of a delay communication session (e.g., an electronic mail (email) message), part of a fax message, etc. If the handwritten communication is to be part of a real time interactive communication session, then the method continues to step 213 and the handwritten communication device sends the handwritten image to another communication device via the inter communication system interface. For example, the inter communication system interface may provide wireless transmission of the handwritten image through a PSTN and the Internet to an internet address and an active personal computer connected to the internet address may display the handwritten image in real time. On the other hand, if the handwritten image is being transmitted as part of a delayed communication session such as an email message, then the handwritten communication device determines at decision step 211 if the handwritten image should be included with a previously received message. If so, then at step 212 the handwritten image and received message are sent to, for example, an email address and stored in an email directory as a pending message. The actual handwritten image message may be integral to the message field or an attachment to the email. In either case, the handwritten image message may be accessed and displayed on another communication device connected to the receiving email address with a previously transmitted message. If the handwritten image is not to be included with a previously received message, then at step 214 the handwritten message itself is sent to another communication device. If the handwritten image is to be sent as a facsimile, then at step 215 the handwritten image will be sent to a facsimile number.

Figure 3:
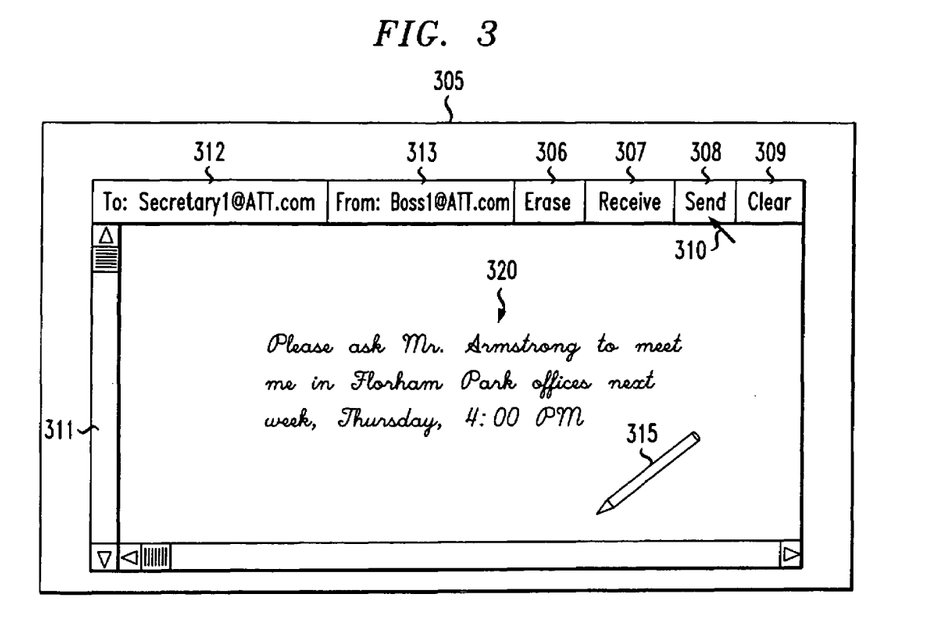
FIG. 3 shows an example of an electronic communication device including a touch screen on which a handwritten message may be created in accordance with one embodiment of the present invention.

FIG. 3 provides an illustration of one exemplary touch screen display and pen or stylus according to the present invention, including an exemplary handwritten communication. The touch screen display 305 includes erase 306, receive 307, send 308, and clear 309 buttons. These buttons may be physical buttons or part of a graphical user interface (GUI) activated via touch on the touch screen display. The touch screen may also have a cursor/pointer 310 which may be used to activate such buttons. Further, the touch screen may contain one or more scroll bars 311 (vertical and/or horizontal) so that the user can scroll up and down in a message including a handwritten document. The scroll may be activated with, for example, a stylus or pen 315. The device may also provide auto- scrolling when, for example, the stylus/pen 315 is placed in a predetermined lower portion of the touch screen display area. For example, the lower ¼ to ½ inch of the touch screen display could be programmed to have a different background color and result in the display automatically scrolling up additional space (e.g., one line) anytime the stylus is placed within this area of the touch screen.

An exemplary handwritten message 320 is provided in the center of the touch screen display 305. This message is created by a user pressing the stylus of pen 315 on the touch screen display 305 and writing the various letters for the words in the sentence. In response the pixels touched by the stylus or pen 315 turn on and become a contrasting color (e.g., black) to the background color of the display (e.g., white). A symbol or a drawing (heart shape, check mark, etc.) could likewise be created as the message or part of the message. Note that the handwritten image, or a portion thereof, could be in any color selected by the user from a color palette by adding an additional icon and color palette feature to the electronic handwritten communication device. Further, a typed message or portion of a message could be created if the handwritten communication device includes a keypad or keyboard feature. To erase a portion of the handwritten image, the erase button 306 may be pressed and the stylus or pen 315 then pressed on the screen over the portion of the image to be erased. If the larger end (erasure) of the stylus or pen 315 is used a larger area will be erased at one time. In any case, the erasing procedure will turn the color of the pixels which are touched to the color of the display background (e.g., white). Pressing the clear button 309 will clear the displayed portion of the document (i.e., one screen), a selected portion of the screen (i.e., highlighted portions), and/or the entire document. Pressing the send button 308 will transmit the handwritten communication to the electronic address (e.g., internet email address) or telephone number inserted in the "To" box 312. Pressing the receive button 307 will enable the handwritten communication device to receive messages. For example, it might display an email directory or enable a real time interactive communication to be received when a user is alerted of the message.

Figure 4:
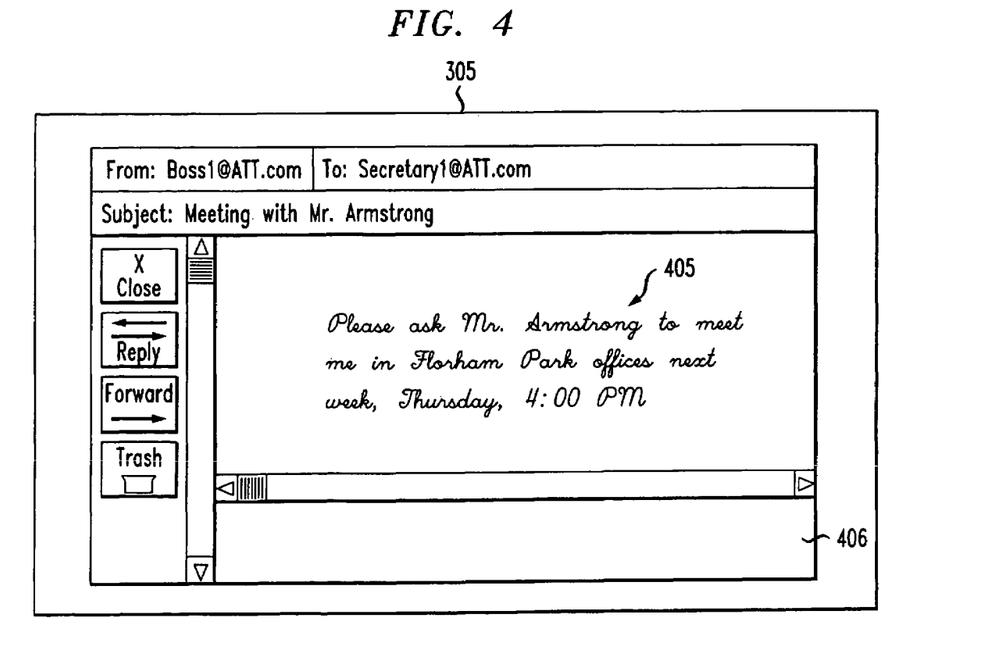
FIG. 4 shows an example of the handwritten message shown in FIG. 3 as received and viewed on another communication device in accordance with one embodiment of the present invention.

Referring to FIG. 4, an example of the handwritten message shown in FIG. 3 as received and viewed on another communication device is provided. The display 305 of another communication device shows displaying the handwritten image created with the handwritten communication device on a display screen 405 of, for example, a personal computer. In this case, the handwritten image was transmitted as an email message but may have been sent as an instant message, a fax, or a direct image. Alternatively, the handwritten image could be sent to another handwritten image device (e.g., via infrared (IR) ports). In any case, the handwritten image is displayed on screen in the likeness as it was created. However, it may appear on the display 305 of a receiving communication device in the same size, a larger size, or a smaller size, than the size at which it was created. The sizing of the image may be provided by the software or firmware of the handwritten image device transmitting the image, by a server within a communication system transporting or storing the image, or by the receiving communication device (as will be explained in more detail below). Further, as previously noted, the handwritten image may appear in the email message field 405 as illustrated in FIG. 4, or as an attachment to the email message format in, for example, attachment field 406.

Figure 5:
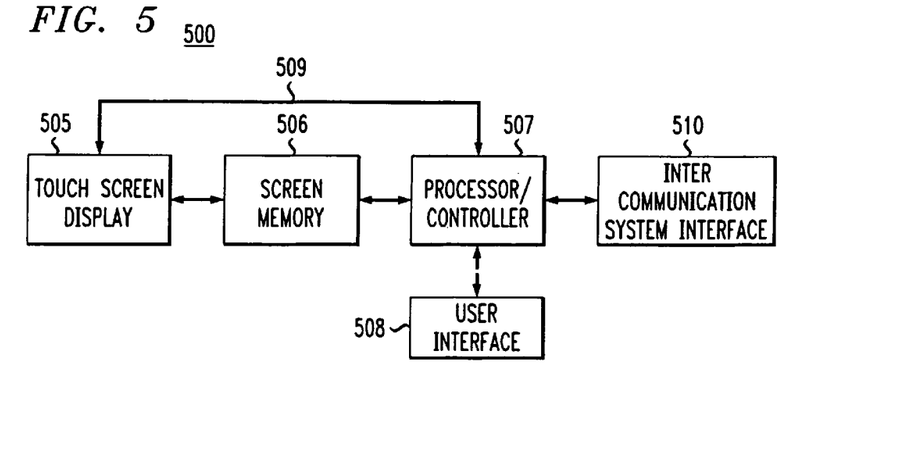
FIG. 5 shows a block diagram for the configuration of various electrical components which may be included in a mobile handwritten message device in accordance with another embodiment of the present invention.

Referring now to FIG. 5, another embodiment of the handwritten communication device is provided. This embodiment is exemplary of a mobile handwritten communication device such as a personal digital assistant (PDA) which may be carried inconspicuously into a meeting. The mobile handwritten communication device 500 includes a touch screen display 505 upon which a handwritten communication may be created using a stylus, pen, or other writing object. A screen memory 506 is coupled to the touch screen display 505 and functions to save the handwritten communication image created by a user on the touch screen display 505. As with the previous embodiments, the screen memory 506 may be integral with, for example, the pixel circuitry of the touch screen display 505. A processor/controller 507 is coupled to the screen memory 506 and coupled to the touch screen display. The connection 509 between the touch screen display 505 and the processor/controller 507 allows various pen events which occur on the touch screen display 505 to be processed by the processor/controller 507 without interacting with screen memory 506. For example, selecting a particular mode such as creating and/or sending a handwritten image to another party may be initiated via a pen event sent on line 509 to the processor/controller 507 in response to touching a stylus on a button icon displayed on the touch screen display 505. An inter communication system interface 510 may be a transceiver or modem and is coupled to the processor/controller 507. In a preferred embodiment the inter communication system interface 510 may be a wireless interface which operates at radio frequencies and/or an infrared interface. Finally, the handwritten communication device 500 may include a user interface 508 for notifying a user of an incoming message.

Figure 6:
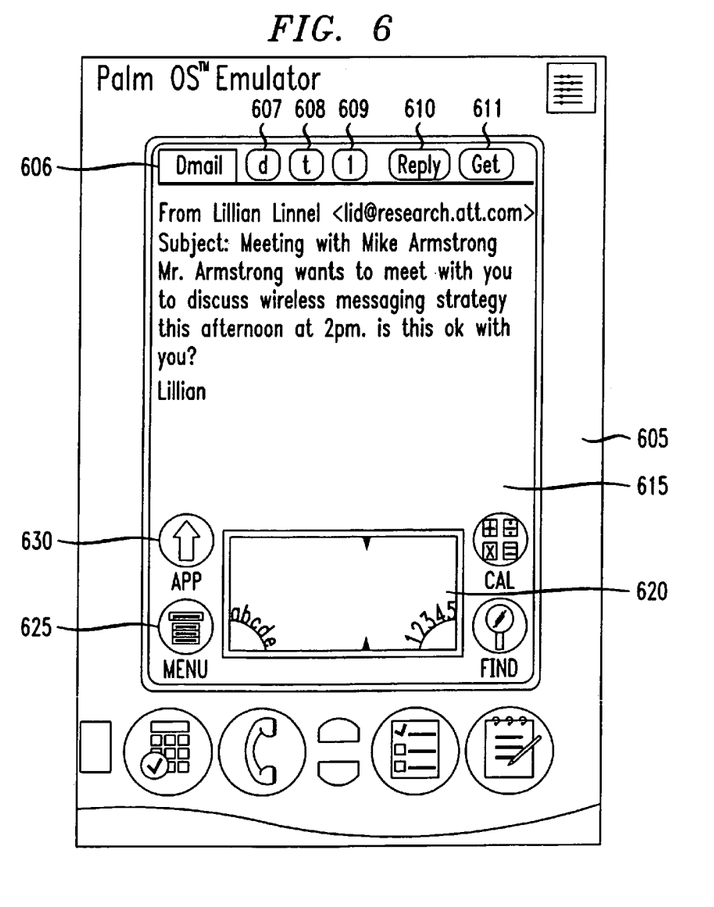
FIG. 6 shows another example of a hand-held communication device, a Palm™ Handheld Computer (by using a Palm OS™ Emulator) including a touch screen on which a handwritten message may be created in accordance with a further embodiment of the present invention.

One exemplary PDA which may use the circuitry illustrated in FIG. 5 is the Palm™ Handheld Computer. An exemplary embodiment of the invention was developed for the Palm™ Handheld Computer using the Palm OS™ Emulator as shown in FIG. 6. The Palm OS™ Emulator 605 has been used to develop and prove out operation of a handwritten communication device according to the invention by programming it with custom software, identified herein as DoodleMail™ application (Dmail) as illustrated at 606. The Dmail software program is based on the Doodle 0.6, released Apr. 26, 1997, software program developed by Roger E. Critchlow Jr. for doodling on the Palm™ Handheld Computer and is modified to include electronic mail functionality as provided by the present invention. The Dmail 606 software may include the following feature/functions as explained below.

Referring now to FIG. 6, a Dmail 606 menu bar may include various function buttons such as a draw/erase button ("d" 607), a handwritten image/typed text button ("t" 608), a stored message button ("1" 609), a reply button ("Reply" 610) and a message waiting button ("Get" 611). The draw/erase button 607 functions to toggle between the draw mode ("d") wherein a handwritten image may be created on the major portion 615 of the Palm™ Handheld Computer screen and the erase mode ("e") wherein portions of a handwritten image displayed on the Palm™ Handheld Computer screen may be erased (e.g., filled in with the screen background color). The handwritten image/typed text button 608 functions to toggle between a handwritten image mode ("t") wherein a user can create a message by writing on the main portion 615 of the Palm™ Handheld Computer touch screen with a stylus and the type text mode ("T") wherein a typed text message can be created. A typed text message may be created on a Palm™ Handheld Computer using one of two different methods; graffiti or displayed keyboard. The default in Dmail may be the graffiti mode. In the graffiti mode a typed text message may be created by the user performing predetermined stylus strokes in the information entry box 620. Alternatively, while in the typed text mode ("T") the user may activate a keypad entry method by contacting the stylus in the lower left hand corner of the information entry box 620 (where "abcde" is displayed) so as to display a touch text keypad on the major portion of the screen. The keyboard could also be a physically separate keyboard attached to the Palm™ Handheld Computer via a communication link. In these manners, typed text may be included with a handwritten Dmail communication. Touching the then displayed "T" button 608 when you are done entering typed text, returns the device to the handwritten image mode.

The stored message button 609 ("1") allows the user to scroll through all incoming and outgoing messages which are stored until removed. By touching the "1" the user may move between messages. Touching the MENU button 625, then selecting the Page option, the user will find several commands that manipulate stored messages. The "clear" command erases all drawing and text in the current message. The "new" command creates a new blank message. The "remove all" command deletes all saved messages. Thus, a user can select and manipulate the various incoming and outgoing messages stored in the Palm™ Handheld Computer. In one variation of the invention, the user may also select and manipulate the various incoming and outgoing messages stored on a server, for example a handwritten message server, to which the handwritten communication device is coupled via a communication link.

The "Reply" button 610 allows a user to respond to an incoming message. A user may respond to an incoming message by scribbling on the touch screen including the incoming message and touch "Reply". In response, the Palm™ Handheld Computer provides a pop-up window that confirms the sender to whom the user is replying and an "OK" and "Cancel" button (not shown). For example, to reply to the message from Lillian Linnell illustrated on the screen shown in FIG. 6, the user can then enter a handwritten reply message using Dmail with the draw/erase button 607 and the handwritten image/typed text button 608 in their "d" and "t" modes, respectively. This handwritten message would be created by scribing on the main touch screen area 615 with, for example, a stylus. Alternatively, the message could be typed or partially typed and partially handwritten. Then the user may send the message by activating the "Reply" button 610. A pop up window will appear indicating that a reply will be sent to Lillian Linnell. Then the user may touch the OK button and the handwritten reply message will be sent to Lillian Linnell. At this pop up window, the user may enter an alternate or additional recipient's address.

To get new messages using Dmail, a user may activate the message waiting button ("Get" 611) on the Palm™ Handheld Computer. If there are new messages, the Palm™ Handheld Computer may, for example, beep with the alarm tone and/or flash the screen for thirty seconds. To stop the flashing, the user may touch the touch screen with the stylus. The new message is automatically displayed when it is received. If more than one message has been received, the user touches the stored message button 609 ("1") to step through the messages.

The user may also program the Dmail to automatically poll for incoming messages. To set up automatic polling for incoming messages the user would first touch the menu button 625. Then the user would select the "Message" and "AutoCheck" option features (not shown). Next, the user would ensure that the "ENABLED" function box is checked (not shown). Then the user would specify how often they wish to check for incoming messages, e.g., 30 minutes (not shown). If the Palm™ Handheld Computer is powered off with DMail running, it will periodically wake up and poll for new messages. To stop the automatic polling, power up the Palm™ Handheld Computer and start the application launcher 630 or any other application.

This embodiment was developed such that incoming messages must be short and be limited to a single page including the handwritten reply so as to simplify the operation to not include a screen scroll feature. In this case, the messages will be truncated after the end of a single page. However, one skilled in the art recognizes that a scroll screen feature is well known in the art and may be added along with sufficient memory allocation for each message so that messages may occupy more than one screen.

To send a new message a user may first load the Dmail software by touching the applications button 630, and then clicking on the Dmail icon. Then the user may touch and activate the menu button 625 and select the "Page" and "Sew" option features (not shown) to get a blank screen. Once the main screen area 615 appears blank, the user may scribe the message on the main screen area 615. Next, once the message is complete, the user may touch the displayed "Send" button that appears in place of the "Reply" button when a new message is created (not shown), insert the outgoing address on the pop-up window, and touch the "OK" button.

Prior to using Dmail for the first time, the user will need to configure their Palm™ Handheld Computer. First, the user would load the Dmail software onto their Palm™ Handheld Computer. Then the user would configure the device to properly operate Doodlemail by touching the menu button 625 and selecting the "Message" and "Configure" option features. The fields available for user input include the SMTP Server, From, Address, POP3 Server, User, and Password fields. The "SMTP Server" field identifies the server for outgoing messages. The "From" field is for input of the user's name. It will then appear in all outgoing messages created using Dmail. The "Address" field is for entering the user's return address (e.g., email address) for messages sent by the user when using Dmail. For example, it may be the address to which a person would send the user email at a chosen POP3 server. This address will appear in outgoing Dmail messages. The "POP3 Server" field is to include the electronic address of the POP3 server selected by the user. The "User" field would include the user's login name on the POP3 server. The "Password" field is for entering the user's password on the POP3 server.

Figure 7:
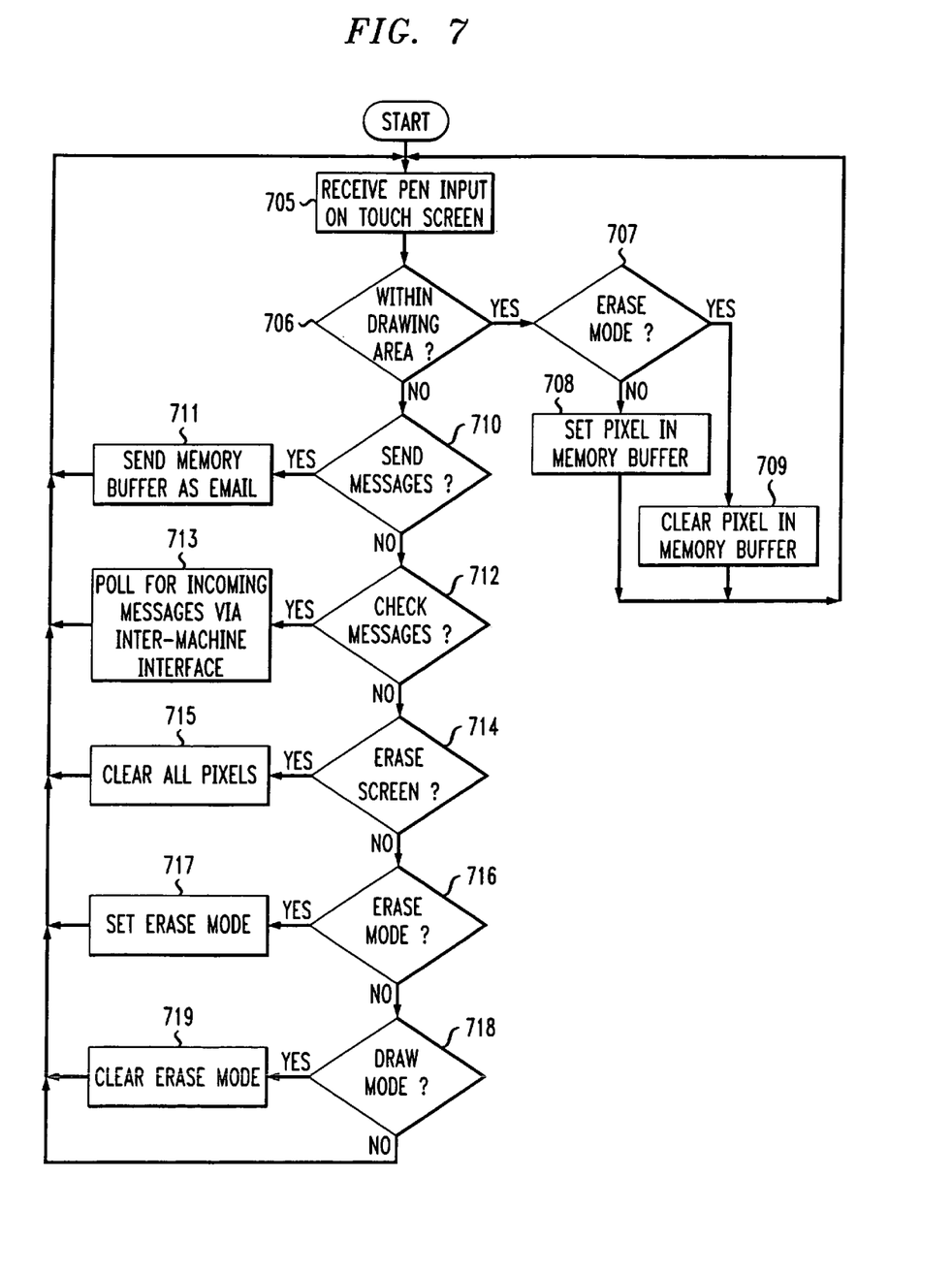
FIG. 7 is a process flow diagram illustrating another exemplary method of providing handwritten messaging using, for example, a Palm™ Handheld Computer, in accordance with an embodiment of the present invention.

Referring now to FIG. 7, a process flow diagram illustrating one exemplary method of operating the handwritten message application using, for example, a PDA such as a Palm™ Handheld Computer is provided. Once the handwritten message application, for example Dmail, is activated as a resident application program on the Palm™ Handheld Computer the user is free to operate the application's feature/functions. First, at step 705, the program awaits initiation by the user, for example, touching the touch screen display 505 with, for example, a pen or stylus. Next, in decision step 706, the system determines whether the pen or stylus contact on the touch screen display 505 is within the handwritten input drawing area 615. If so, then at decision step 707, the system determines if the erase mode is activated. If not, then at step 708 the pixels touched by the pen or stylus on the touch screen display 505 are set in, for example, the screen memory buffer (e.g., 506). If the erase mode is set, then at step 709 the pixels touched by the pen or stylus on the touch screen display 505 are cleared or change to the color of the screen background in, for example, the screen memory buffer (e.g., 506). This process will continue until the pen or stylus touches an area of the touch screen display 505 outside of the drawing area 615.

If the pen or stylus touches a feature/function actuation button, for example a button displayed on the touch screen display 505 in an area other then the main drawing area 615, then the program will determine what change in program activation is to occur such as those indicative of steps 710-719. In one instance, at step 710 the program will determine whether a message is to be sent (i.e., a new message or a reply message). If so, at step 711, the Palm™ Handheld Computer will send the message stored in, for example, the screen memory 506, to the designated electronic address via the inter-communication system interface 510. For example, the message may be transmitted via a wireless modem to a wireless base station or satellite, via a wire line modem to a telephone or cable station, or via an infrared transmitter to an infrared receiver (e.g., to another Palm™ Handheld Computer). In another instance, at decision step 712, the program will determine whether a user wishes to check awaiting messages. In this case, the user may have manually activated the polling of incoming messages by touching the "get" button 611. If so, at step 713, the Palm™Handheld Computer will poll, for example, the POP3 server, for any incoming messages via the inter-communication system interface 510. In a further instance, at decision step 714 the program will determine whether a user wishes to erase the entire drawing area 615 of the touch screen display 505. For example, the user may wish to create a new message and touch the menu button 625 and select the "Page" and "New" options. If so, at step 715, the Palm™ Handheld Computer will clear, or set to the screen background color, all pixels included in the drawing area 615 of the touch screen display 505.

In a still further instance, at decision step 716, the program will determine whether a user has touched the draw/erase button 607 so as to place the Palm™ Handheld Computer in the erase mode and enable clearing only certain identified pixels touched by the user. If so, at step 717, the Palm™ Handheld Computer will set the clear mode so that any pixel in the drawing area 615 of the touch screen display 505 which is touched by the user will be cleared or set to the screen background color. In an even further instance, at decision step 718, the program will determine whether a user has touched the draw/erase button 607 so as to place the Palm™ Handheld Computer in the draw mode so as to enable handwritten message entry by the user touching desired pixels. If so, at step 719, the Palm™ Handheld Computer will set the draw mode and clear the erase mode so that any pixel in the drawing area 615 of the touch screen display 505 which is touched by the user will be set as part of a handwritten message using a color different than the touch screen display background color. Otherwise, the program will await receipt of pen or stylus input on the touch screen display 505. One skilled in the art recognizes that although the embodiment described in FIG. 7 discloses a particular sequence for the decision steps, the handwritten message software program of the present invention may be structured to consider any number of these and other decision steps, in any order.

Figure 8:
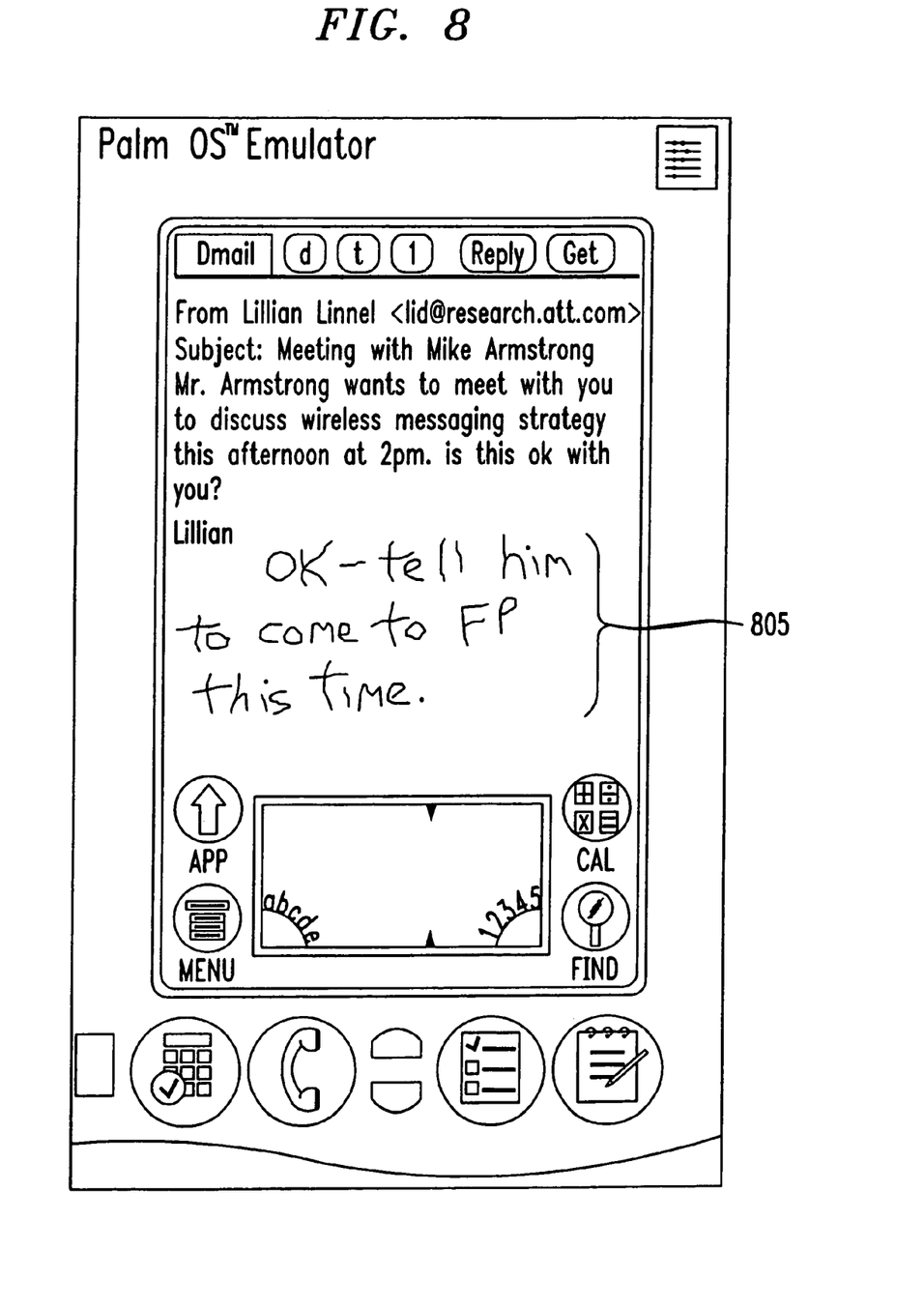
FIG. 8 shows an example of the handwritten message which may be sent in response to the message shown in FIG. 6, in accordance with one embodiment of the present invention.

Referring now to FIG. 8, an example of the handwritten message which may be sent in response to the message shown in FIG. 6 is illustrated. By scripting the words on the touch screen display 505, the user of the Palm™ Handheld Computer is able to send a handwritten reply message, for example, message 805: "OK—tell him to come to FP this time." Alternatively, the handwritten reply message could simply have been a symbol such as simply a check mark (i.e., ✓). In any case, using Dmail according to the present invention, the user is able to craft a handwritten message on the touch screen display 505 of a Palm™ Handheld Computer to quickly, easily, quietly, and unobtrusively communicate while in a meeting or traveling in a moving vehicle.

Figure 9:
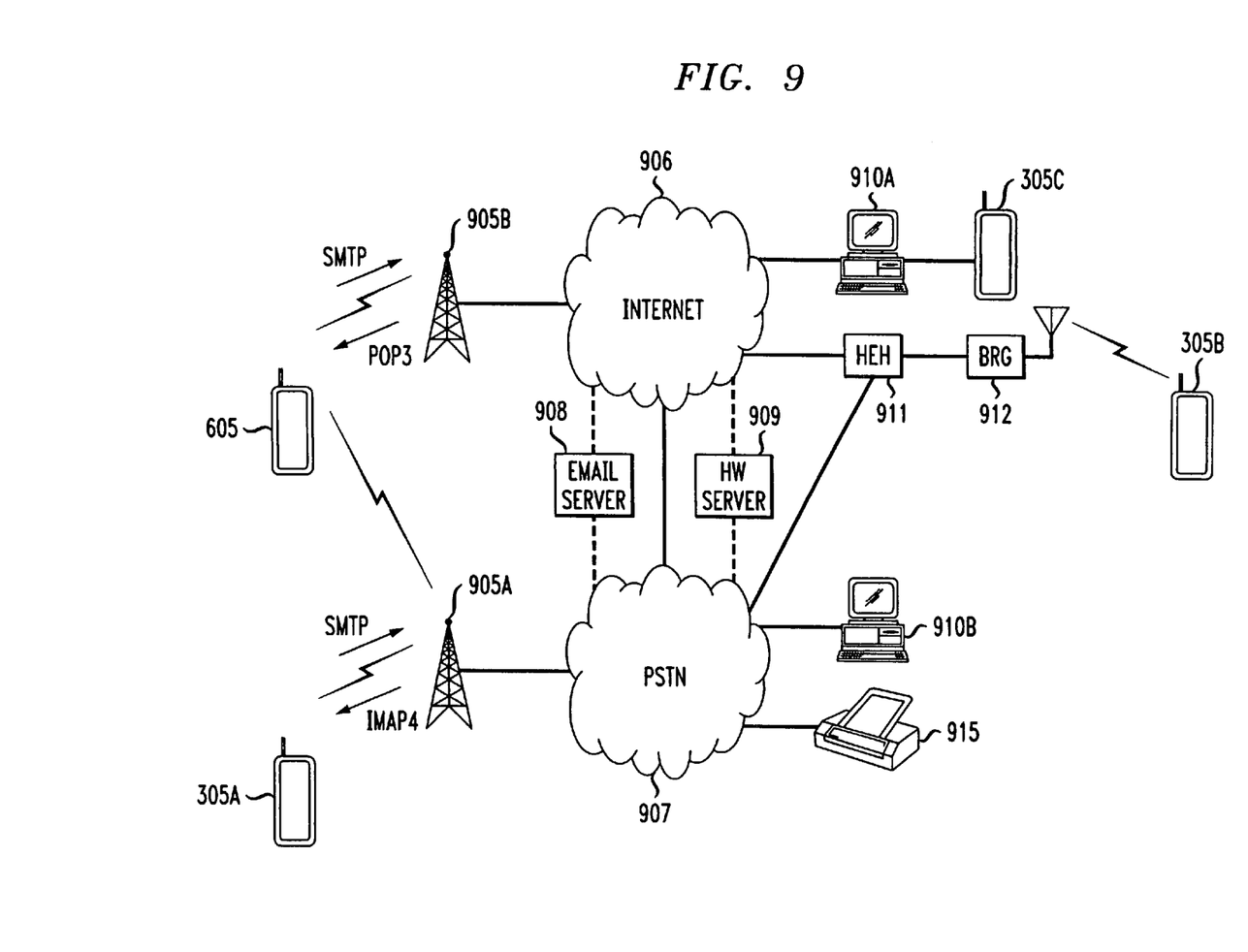
FIG. 9 shows an exemplary schematic representation of a communication network according to one embodiment of the present invention.

Referring now to FIG. 9, a schematic representation of an exemplary communication network according to one embodiment of the present invention will now be described. A first handwritten message mobile communication device 305A may be coupled to a wireless communication base station 905A. The wireless communication base station 905A may be coupled to a public service telephone network (PSTN) 907. Further, the first handwritten message mobile communication device 305A may be coupled to another wireless communication base station 905B which may be coupled to the Internet 906. The PSTN 907 and the Internet 906 may be coupled together. A desk top personal computer (PC) 910A with a handwritten message communication device 305C attached may be coupled to the Internet 906 and a desk top personal computer (PC) 910B may be coupled to the PSTN 907. Further, a cable or hybrid fiber cable head end hub (HEH) 911 may be coupled to the Internet 906, PSTN 907, and a broadband residential gateway (BRG) 912. In addition, an email server 908 and/or a handwritten message server (HW Server) 909 may be coupled to the Internet 906 and the PSTN 907 to support handwritten messages from a handwritten message communication device. A second handwritten message mobile communication device 305B may be coupled to the BRG 912. A third handwritten message mobile communication device 605 may be coupled to wireless base station 905B and/or wireless base station 905A. Further, a facsimile machine 915 may be coupled to PSTN 907.

As noted in FIG. 9, transmissions from the handwritten communication devices (305 and 605) may be sent using, for example, industry standard Simple Mail Transfer Protocol (SMTP). Further, messages sent to the handwritten communication devices (305 and 605) may be sent using, for example, Post Office Protocol (POP3) or Internet Message Access Protocol (IMAP4).

In operation, a handwritten message image may be sent from any of the handwritten message communication devices, 305A, 305B, 305C, or 605, to any other communication device such as PC 910A, PC 910B or fax 915 via the communication system which may include the Internet 906, PSTN 907, a wireless network, and/or a satellite network (not shown). Further, a handwritten message image may be sent from any of the handwritten message communication devices, 305A, 305B, 305C or 605, to each other, with or without being transmitted through a communication network.

One method of operation for sending messages to and from an email server for the handwritten communication device (305 and/or 605) will now be explained. The handwritten communication device (305 and/or 605) may read incoming messages sent from an email server using industry standard protocols such as POP3 or IMAP4. These, and all other protocols mentioned here may be layered on top of the Transmission Control Protocol (TCP). The handwritten communication device (305 and/or 605) sends outgoing messages to, for example email server 908, using industry standard SMTP (Simple Mail Transfer Protocol). The bitmaps of a handwritten message are compressed using a standard such as GIF (Graphics Interface Format) and included within a SMTP message using MIME (Multipurpose Internet Mail Extensions). SMTP requires that email be represented as US-ASCII (American Standard Code for Information Interchange). MIME does this by encoding the compressed bitmaps in base64. This increases the file size by 35%.

If the sending and receiving communication devices have different display sizes, then a means for sizing the handwritten message to the receiving display size may prove useful. The Palm™ Handheld Computer embodiment presents unique considerations in this respect because of its small touch screen display size. The screen size on the Palm™ Handheld Computer is 144×160 pixels. The size of a handwritten image created on a touch screen display size found on the Palm™ Handheld Computer displayed on a normal PC screen (desktop or laptop) is too small to comfortably read. Therefore, in a preferred embodiment of a handwritten message communication device such as the Palm™ Handheld Computer, the size of the image may be increased before it is sent to a PC. Similarly, handwritten messages sent from one handwritten communication device with a larger touch screen display, e.g., say 8½×11 inches, to another handwritten communication device with a smaller touch screen display, e.g., Palm™ Handheld Computer, may need to have the handwritten image reduced in size and/or allocated to more than one screen (or page) for proper display on the smaller touch screen display. In other embodiments, the message could be resized by the receiving device or the receiving and sending devices.

As one approach, for example, a handwritten message image created on a Palm™ Handheld Computer could be double in size by the Palm™ Handheld Computer before sending it to a PC, making it 288×320 pixels. However, this increases the processing time for the compression by a factor of 4 and the transmitted file size by a factor of 2.5.

As another approach, a special server, the HW server 909, may be provided having its own protocol to process outgoing messages from the device. The HW Server 909 receives the messages in binary format (saving the 35%) and in the original 144×160 screen size (saving about 10 seconds of processing time on the Palm™ Handheld Computer for the compression). The HW server 909 does the expansion and MIME encoding and resends the message using SMTP. Since the server will likely have a much faster processor than the Palm™ Handheld Computer, this work is done very quickly on the server. Similarly, the HW server 909 could reduce a handwritten image size before sending it to a Palm™ Handheld Computer.

The message format between the Palm and the server may be, for example:- - -destination email address<newline> reply email address<newline> sender's name<newline> subject<newline> compressed image in binary- - -. Further enhancements, such as authenticating the sender with a password may be included and may be implemented using approaches which are well known in the art. (See the IMAP protocol for example).

Although particular embodiments of the present invention have been shown and described, it will be understood that it is not intended to limit the invention to the embodiments described herein and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

For example, the present invention may also include coupling a touch screen display to a PC and providing software on the PC to enable the user to create and send handwritten message images with a PC. This could be a touch screen display the size of a typical sheet of writing paper (e.g., 8½×11 inches), a PDA, or a mobile telephone.

All publications, patents, and patent applications cited herein are hereby incorporated by reference in their entirety for all purposes.

What is claimed is:

1. A method of electronic communications comprising the steps of:

displaying for a first user on a touch screen display of a mobile electronic communication device a typewritten message that was received over a wireless connection, the text of said message having been composed by a second user;

receiving a handwritten message image that was input by said first user using said touch screen display; and transmitting said handwritten message image together with said typewritten received message in the same message field to an electronic message address associated with another electronic communication device;

the handwritten message image being not in an email attachment.

2. The method of claim 1, further comprising the step of sizing said handwritten message image to a different size appropriate for a display size of said another communication device.

* * * * *